US007946496B2

(12) United States Patent
Ford et al.

(10) Patent No.: US 7,946,496 B2
(45) Date of Patent: May 24, 2011

(54) RADIO FREQUENCY IDENTIFICATION (RFID) LABEL APPLICATOR

(75) Inventors: John C. Ford, Boca Raton, FL (US); Christopher Marcus, Simpsonville, SC (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 1031 days.

(21) Appl. No.: 11/660,302

(22) PCT Filed: Aug. 29, 2005

(86) PCT No.: PCT/US2005/030958
§ 371 (c)(1),
(2), (4) Date: Feb. 12, 2007

(87) PCT Pub. No.: WO2006/026661
PCT Pub. Date: Mar. 9, 2006

(65) Prior Publication Data

US 2007/0256788 A1 Nov. 8, 2007

Related U.S. Application Data

(60) Provisional application No. 60/604,930, filed on Aug. 27, 2004, provisional application No. 60/605,035, filed on Aug. 27, 2004, provisional application No. 60/604,931, filed on Aug. 27, 2004, provisional application No. 60/604,929, filed on Aug. 27, 2004.

(51) Int. Cl.
*G06K 19/00* (2006.01)

(52) U.S. Cl. ....... 235/487; 340/572.1; 156/64; 156/541; 156/493

(58) Field of Classification Search .................. 235/387, 235/487; 156/64; 340/572.1, 104
See application file for complete search history.

(56) References Cited

U.S. PATENT DOCUMENTS

| | | | | |
|---|---|---|---|---|
| 5,753,072 | A * | 5/1998 | Taylor | 156/493 |
| 5,853,530 | A * | 12/1998 | Allen | 156/541 |
| 6,593,853 | B1 * | 7/2003 | Barrett et al. | 340/572.1 |
| 7,439,858 | B2 * | 10/2008 | Feltz et al. | 340/572.1 |
| 2002/0062989 | A1 * | 5/2002 | Yumi | 174/261 |
| 2003/0063001 | A1 * | 4/2003 | Hohberger et al. | 340/572.1 |
| 2003/0227528 | A1 * | 12/2003 | Hohberger et al. | 347/104 |
| 2005/0167024 | A1 * | 8/2005 | Sanzone et al. | 156/64 |

* cited by examiner

*Primary Examiner* — Michael G Lee
*Assistant Examiner* — Kristy A Haupt

(57) ABSTRACT

The invention is related to an RFID applicator that may include a peeler member (140) including a peel end (142), the peeler member being configured to cause an RFID label (102) to peel away from a web (110) when the web passes around the peel end; a label tamp assembly (150) configured to receive the RFID label and to move the RFID label into contact with an item (104) on which the RFID label is to be applied; and a label reject assembly having an extendable path altering mechanism (500) located proximate to said peel end, configured to advance from a retracted position to an extended position to alter a path of the web around said peel end, and wherein said extendable path altering mechanism is positioned and dimensioned to inhibit an RFID label from peeling away from said web.

18 Claims, 7 Drawing Sheets

RADIO FREQUENCY IDENTIFICATION (RFID) LABEL APPLICATOR

TECHNICAL FIELD

The present application relates to radio frequency identification (RFID) label applicators, and more particularly, to a RFID label applicator capable of programming RFID labels, detecting defective RFID labels and rejecting the defective RFID labels.

BACKGROUND INFORMATION

Radio frequency identification (RFID) systems are generally known and may be used for a number of applications such as managing inventory, electronic access control, security systems, automatic identification of cars on toll roads, and electronic article surveillance (EAS). RFID devices may be used to track or monitor the location and/or status of articles or items to which the RFID devices are applied. A RFID system typically comprises a RFID reader and a RFID device such as a tag or label. The RFID reader may transmit a radio-frequency carrier signal to the RFID device. The RFID device may respond to the carrier signal with a data signal encoded with information stored on the RFID device. RFID devices may store information such as a unique identifier or Electronic Product Code (EPC) associated with the article or item.

RFID devices may be programmed (e.g., with the appropriate EPC) and applied to the article or item that is being tracked or monitored. A RFID reader/programmer may be used to program RFID devices and to detect defective RFID devices. Label applicators have been used to apply programmed RFID labels to items or articles.

Existing RFID applicators, however, have encountered problems in handling defective labels. In existing RFID applicators, a RFID reader/programmer may be located upstream from the applicator. One problem occurs when tracking a defective label from the point at which it is detected to the point at which it can be rejected. Because of potential differences in the RFID label footprints and web paths through the applicator, the number of labels between the point of detection and the point of rejection may be inconsistent. As a result of this inconsistency, an applicator may reject a good label and may apply a defective label to the product.

Another problem is that the rejection of defective RFID labels may interrupt the label application process and may result in labels not being applied to items or products. When a defective label is detected using conventional techniques, it may be removed from the process and another label may be re-encoded in its place. Each defective label that is encountered may cut the product application rate by up to an additional 50%. Product lines may need to be run slower so as not to miss a product in the event a defective label is detected.

SUMMARY OF THE INVENTION

The invention is related to an RFID applicator. Embodiments of the invention may include a peeler member including a peel end, the peeler member being configured to cause an RFID label to peel away from a web when the web passes around the peel end; a label tamp assembly configured to receive the RFID label and to move the RFID label into contact with an item on which the RFID label is to be applied; and a label reject assembly having an extendable path altering mechanism located proximate to said peel end, configured to advance from a retracted position to an extended position to alter a path of the web around said peel end, and wherein said extendable path altering mechanism is positioned and dimensioned to inhibit an RFID label from peeling away from said web.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

Numerous specific details may be set forth herein to provide a thorough understanding of the embodiments of the disclosure. It will be understood by those skilled in the art, however, that various embodiments of the disclosure may be practiced without these specific details. In other instances, well-known methods, procedures, components and circuits have not been described in detail so as not to obscure the various embodiments of the disclosure. It can be appreciated that the specific structural and functional details disclosed herein are representative and do not necessarily limit the scope of the disclosure.

It is worthy to note that any reference in the specification to "one embodiment" or "an embodiment" according to the present disclosure means that a particular feature, structure, or characteristic described in connection with the embodiment is included in at least one embodiment. The appearances of the phrase "in one embodiment" in various places in the specification are not necessarily all referring to the same embodiment.

Figure 1:
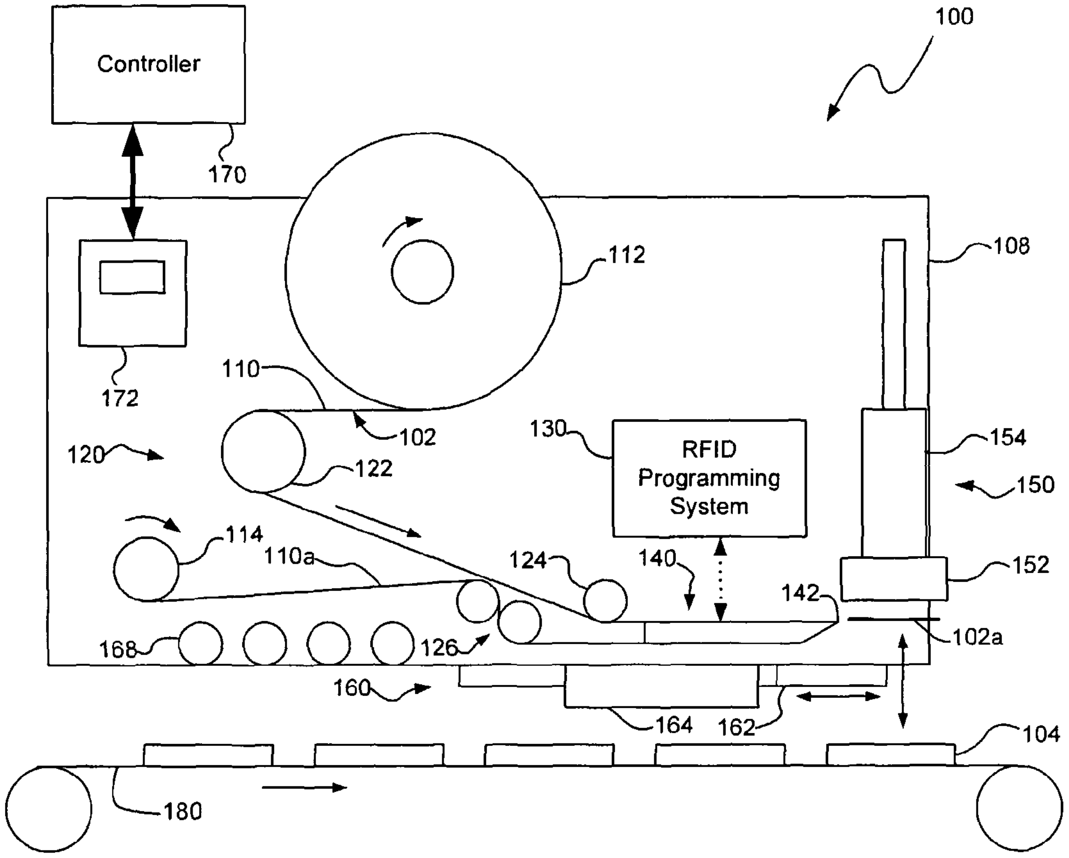
FIG. 1 is a diagrammatic view of a RFID applicator, consistent with one embodiment of the invention.

Referring to FIG. 1, radio frequency identification (RFID) label applicator 100, consistent with embodiments of the invention, may be used to apply RFID labels 102 to articles or items 104. The RFID label applicator 100 may also be used to program RFID labels 102, to detect defective RFID labels, and to reject the defective labels such that the defective labels are not applied to the items 104. The articles or items 104 may be products, merchandise, or any other items or articles that may be monitored using RFID techniques.

The RFID labels 102 may be removably secured to a backing material or web 110 such that the RFID labels 102 are supported on the web 110 during programming and may be removed (e.g., peeled away from the web 110) for application. The web 110 supporting the labels 102 may be rolled onto a roll 112, which is unwound to allow the web 110 to pass through the label applicator 100. After the RFID labels 102 are removed or rejected, scrap web 110*a* may be rewound onto a rewind roll 114.

One embodiment of the RFID label applicator 100 may include a web feeding mechanism 120 to feed the web 110, a RFID programming system 130 to program the RFID labels 102, a peeler member 140 to peel the RFID labels 102 from the web 110, a label tamp assembly 150 to apply the RFID labels 102 to the items 104, and a label reject assembly 160 to reject RFID labels. The RFID label applicator 100 may also include an applicator controller 170 to control operation of the RFID label applicator 100. The articles or items 104 may be arranged in a line (e.g., a product line) and may be moved, for example, using a conveyor 180 or other similar mechanism. Components in the applicator 100 may be mounted or secured to an applicator frame 108.

The RFID label applicator 100 may also include other components not shown in FIG. 1. Examples of additional components include, but are not limited to, a label sensor to sense and position the labels 102 relative to the RFID programming system 130, an item sensor to sense and position the items 104 relative to the tamp assembly 150, and an integrated printer to print indicia on the labels 102. One example of a label sensor includes a thru-beam that shines a light from beneath the web to a light sensor 110 positioned above the web 110.

The web feeding mechanism 120 may include a tensioning roller 122 and an idler roller 124, which guide the web 110 with the RFID labels 102 to the peeler member 140. The web feeding mechanism 120 may also include a drive and nip roller assembly 126 that takes up the scrap web 110*a* and feeds the scrap web 110*a* to the web rewind roll 114. The drive and nip roller assembly 126 may be driven to pull the scrap web 110*a*, thereby causing the web 110 with the RFID labels 102 to pass around the peeler member 140. The unwind roll 112 and/or rewind roll 114 may also be driven (e.g., with servomotors) to facilitate unwinding of the web 110 and/or rewinding the scrap web 110*a*.

The RFID programming system 130 may include a RFID reader/programmer coupled to one or more RFID programming antennas, as will be described in greater detail below. The RFID programming system 130 may include any RFID reader/programmer known to those skilled in the art for reading and/or programming RFID devices, such as the type known as the Sensormatic® SensorID™ Agile 2 Reader available from Tyco Fire and Security. The RFID programming system 130 may also be capable of detecting defective RFID labels, for example, by attempting to read a RFID label after applying programming signals.

The peeler member 140 may include a peel tip 142 having a radius and forming an angle such that a RFID label 102 peels away from the web 110 as the web 110 passes around the peel tip 142. In one embodiment, the radius of the peel tip 142 may be in a range of about 0.030 in. and the angle formed by the peel tip 142 may be in a range of about 90° or less. Other radii and angles are within the scope of the invention and may depend upon the adhesion properties (e.g., the adhesion strength) of the RFID labels 102 on the web 110. The peeler member 140 may be made of a rigid material such as aluminum. In one embodiment, the peeler member 140 may be in the form of a plate or a bar, although those skilled in the art will recognize other shapes and configurations.

The label tamp assembly 150 may include a tamp pad 152 coupled to a tamp driving mechanism 154. The tamp pad 152 contacts the non-adhering side of a RFID label 102*a* that has been removed from the web 110 and holds the RFID label 102*a*. The tamp driving mechanism 154 drives the tamp pad 152 and the RFID label 102*a* toward the item 104 to which the RFID label 102*a* is to be applied. One embodiment of the tamp assembly 150 uses a vacuum pressure to retain the RFID label 102*a* in contact with the tamp pad 152. The vacuum pressure may be released and/or air may be blown from the tamp pad 152 to facilitate application of the RFID label 102*a*. Although one embodiment of a label tamp assembly 150 is described herein, the label tamp assembly 150 may include any structure or mechanism for moving a label into contact with an item 104.

The label reject assembly 160 may include an accumulation pad 162 coupled to a label reject driving mechanism 164. Upon determining that a RFID label 102 is to be rejected, the reject driving mechanism 164 drives the accumulation pad 162 into the path of the tamp pad 152. The tamp pad 152 then applies the rejected RFID label to the accumulation pad 162 instead of the item 104. A RFID label may be rejected when the label is determined to be defective or for other reasons. Although one embodiment of the label reject assembly 160 is described herein, the label reject assembly 160 may include any structure for intercepting or otherwise preventing a RFID label from being applied to an item 104.

The tamp driving mechanism 154 and the label reject driving mechanism 164 may include pneumatic actuated air cylinders, such as the type available from PHD, Inc. When air cylinders are used as the driving mechanisms, the RFID label applicator 100 may also include one or more air pressure gauges 168 to monitor and/or adjust operation of the air cylinders, as is known to those skilled in the art. Although the described embodiment uses air cylinders and rods, those skilled in the art will recognize that other linear actuators or driving mechanisms may be used.

The applicator controller 170 may be a programmable logic controller (PLC), such as the type available from Allen-Bradley, Omron or Mitsubishi, or a general purpose computer, such as a PC, programmed to control one or more operations of the applicator 100. The controller 170 may be coupled to the web feeding mechanism 120 (e.g., to the motors, sensors, etc.) to control the feeding of the web 110 around the peeler member 140 and/or to control the positioning of the RFID labels 102 relative to the RFID programming system 130. The controller 170 may also be coupled to the tamp assembly 150 to control application (or tamping) of programmed and removed RFID labels to the items 104. The controller 170 may also be coupled to the label reject assembly 160 to control the rejection of labels, for example, when the label is determined to be defective. The controller 170 may also be coupled to a user interface/control panel 172 to enable a user to monitor the application process and/or to provide commands and/or operating parameters to the controller 170.

The controller 170 and/or user interface 172 may also be coupled to the RFID programming system 130 to control the RFID programming operations. RFID programming operations may be controlled, for example, by allocating Electronic Product Codes (EPC's) and/or other data to be sent to the RFID labels 102 upon receiving an indication that the RFID labels 102 are properly positioned relative to the RFID programming system 130. The controller 170 may also monitor the detection of defective labels to control the label reject assembly 160. The controller 170 may further collect programming data and statistics and provide such data to the user.

According to one method of operation, the web 110 may be advanced around the peeler member 140, for example, by using the drive and nip roller assembly 126 to pull the web 110. As the web 110 is advanced, the unwind roll 112 unwinds the web 110 supporting the RFID labels 102 and the rewind roll 114 rewinds the scrap web 110*a* after the RFID labels 102 have been applied or rejected. When each RFID label 102 on the web 110 is positioned within a programming range of the RFID programming system 130, the RFID programming system 130 may program the RFID label 102 by transmitting radio frequency (RF) programming signals to the RFID label 102 and attempting to read the RFID label 102. The RFID label 102 may then be advanced around the peel tip 142 of the peeler member 140 to remove the RFID label 102. A removed RFID label 102*a* may then be applied to an item 104 using the tamp assembly 150 or may be rejected using the label reject assembly 160. These operations may be repeated for each of the RFID labels 102 on the web 110 and the items 104 may be advanced such that programmed RFID labels 102 are applied to each of the items 104.

Figure 2:
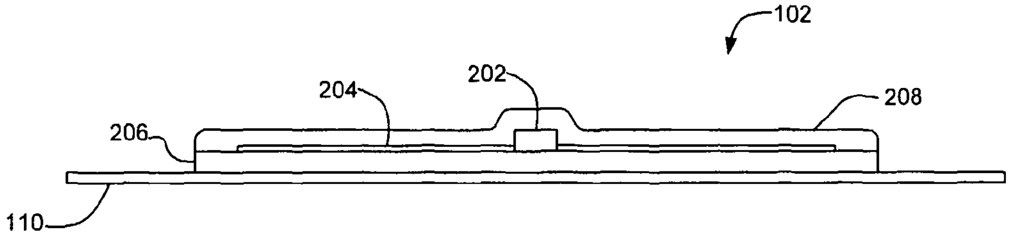
FIG. 2 is a side cross-sectional view of one embodiment of a RFID label that can be used in the RFID applicator, consistent with one embodiment of the invention.

One embodiment of a RFID label 102 is shown in greater detail in FIG. 2. The RFID label 102 may include an integrated circuit (IC) chip 202 coupled to an antenna 204. The IC chip 202 and antenna 204 may be sandwiched between one or more layers or substrates, such as an adhesive substrate 206 and a printable layer 208. The adhesive substrate 206 may include a scrim coated on each side with an adhesive, such as an acrylic based adhesive. The printable layer 208 may be made of a thermal transfer paper or other material suitable for printing. One or more additional layers or substrates may also be incorporated into the RFID label 102, as is known to those skilled in the art. The web 110 may be made of a paper with a release agent such as wax or silicone to allow the RFID label 102 to peel away from the web 110. The RFID label 102 may have a peel adhesion strength (e.g., about 15 N/inch) that allows the RFID label 102 to be removably adhered to the web 110 and later adhered to the items 104. Although RFID labels may have various sizes, one example of the RFID label 102 may be about 3 in. by 3 in. and supported on a web 110 having a width of about 4 in.

One example of a RFID label 102 is the "Combo EAS/RFID Label or Tag" disclosed in U.S. Provisional Patent Application Ser. No. 60/628,303, which is fully incorporated herein by reference. Other examples include the RFID labels commercially available under the name Sensormatic® from Tyco Fire and Security. Those skilled in the art will recognize that the RFID label 102 may include any RFID device capable of being adhered or otherwise secured to articles or items.

Figure 3:
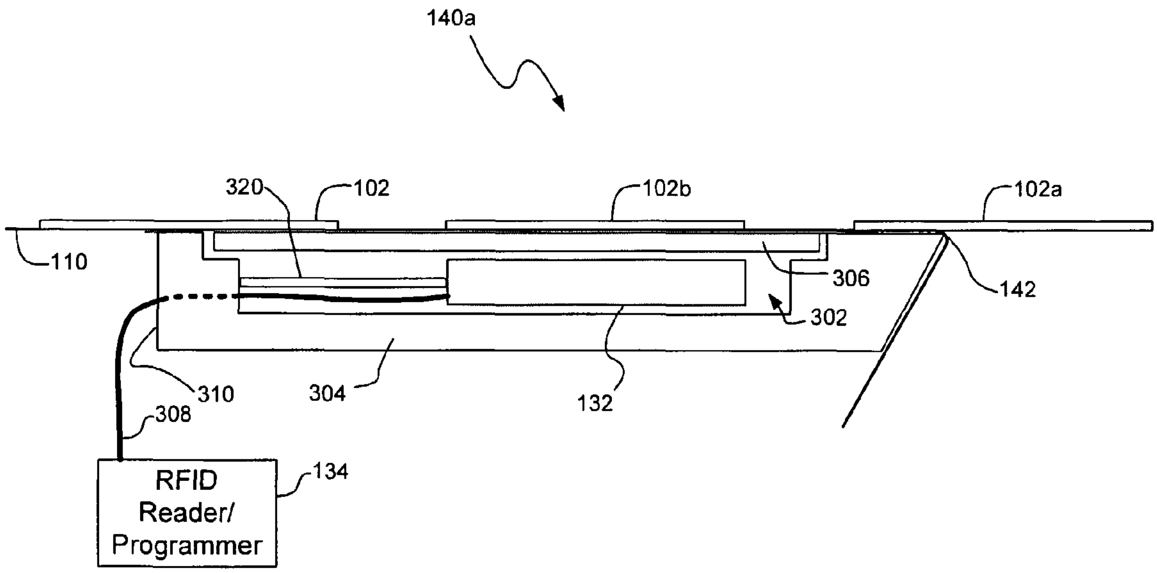
FIG. 3 is a side view of one embodiment of a RFID applicator peeler member with an integrated RFID programming antenna.

Referring to FIG. 3, one embodiment of a peeler member 140*a* is described in greater detail. The peeler member 140*a* may include a RFID programming antenna 132 integrated with the peeler member 140 and connected to a RFID reader/programmer 134. Each RFID label 102 may thus be programmed and verified just before peeling the label and transferring the label to the tamp pad 152 (see FIG. 1). The proximity of the RFID programming antenna 132 to the peel tip 142 allows each defective RFID label to be handled immediately (i.e., without having to track defective labels from a point of detection to a point of application further downstream), which may ensure that defective labels are subject to rejection and programmed labels are applied to items.

According to one embodiment, the RFID programming antenna 132 may be a near-field probe such as the type disclosed in U.S. Provisional Patent Application Ser. No. 60/624,402, which is fully incorporated herein by reference. The programming range of a near-field probe is generally the near-field zone of the antenna or probe. The near field probe may be implemented by enhancing the magnitude of the induction field within the near-near field zone associated with an antenna structure and decreasing the magnitude of the radiation field within the far-field zone associated with the antenna structure. One embodiment of the near field probe may include a stripline antenna terminated into a 50 ohm chip resistor. In one example, the near field probe may have an operating frequency of 915 MHz and the near-field zone may be approximately 5 cm from the probe. One example of the probe may be about 2 to 3 in. long, although those skilled in the art will recognize that smaller probes may be used to allow programming of labels that are smaller and/or spaced closer together on the web.

This embodiment of the peeler member 140*a* may include a cavity 302 in a body portion 304 of the peeler member 140*a*, which is configured to receive the RFID programming antenna 132. A cover 306 may be used to cover the cavity 302. The cover 306 may be made of, or at least coated with, a non-reflective material that will not reflect or absorb the radio frequency waves transmitted by the RFID programming antenna 132 and the RFID device antenna 204. For example, the cover 306 may be made of a plastic material such as the type available under the name Delrin™. A cable 308 may connect the RFID programming antenna 132 to the RFID reader/programmer 134. The cable 308 may extend from the RFID programming antenna 132 through one side 310 of the body portion 304 of the peeler member 140*a*.

The RFID programming antenna 132 may be positioned within the cavity 302 such that the RFID programming antenna 132 transmits radio frequency (RF) programming signals to a RFID label 102*b* positioned over the RFID programming antenna 132 (i.e., within the programming range). The cavity 302 may include an adjustment region 312 that allows the RFID programming antenna 132 to be adjusted laterally within the cavity 302 to accommodate different sizes of labels. For example, the RFID programming antenna 132 may be configured initially to align with the IC in labels having a certain size (e.g., 3 in. by 3 in.) and may need to be adjusted laterally for labels that are smaller or larger. In one example, the lateral adjustment of a probe having a length of about 2 to 3 in. may be in a range of about 1 to 1.5 inches in either direction. An adjustment mechanism, such as a bar or rod 320, may be coupled to the RFID programming antenna 132 to provide mechanical adjustment.

Although the described embodiment shows the RFID programming antenna 132 located inside of the cavity 302 in the peeler member 140*a*, the RFID programming antenna 132 may also be integrated with the peeler member 140*a* in other ways. For example, the RFID programming antenna 132 may be mounted anywhere such that an RFID label 102*b* on the peeler member 140*a* is within the programming range (e.g., the near field) of the programming antenna 132.

According to one method of programming RFID labels, the web 110 may be advanced along the peeler member 140*a* until a RFID label 102*b* is positioned within a programming range of the RFID programming antenna 132. The RFID label 102*b* may be positioned, for example, by stopping advancement of the web 110 when a label sensor (not shown) senses an edge of the RFID label 102*b*. When positioned, RF programming signals may be transmitted to the RFID label 102*b* from the RFID programming antenna 132. RF signals may also be transmitted from the RFID label 102*b* to the RFID programming antenna 132 in an attempt to read and validate the RFID label 102*b*. If the RFID label 102*b* cannot be read or validated, the RFID reader/programmer 134 may indicate that the RFID label 102*b* is defective. After the RFID label 102*b* is either programmed or determined to be defective, the web 110 is advanced along the peeler member 140*a* until the next RFID label 102 is located in the programming range of the RFID programming antenna 132.

A programmed RFID label 102*a* may be subsequently removed as the web 110 supporting the programmed RFID label 102*a* passes around the peel tip 142. In this described embodiment, the programmed RFID label 102*a* is removed when the next RFID label 102*b* is positioned in the programming range. The next RFID label 102*b* may be programmed after the programmed RFID label 102*a* is applied to an item or may be programmed while the programmed RFID label 102*a* is applied to an item.

Figure 4A:
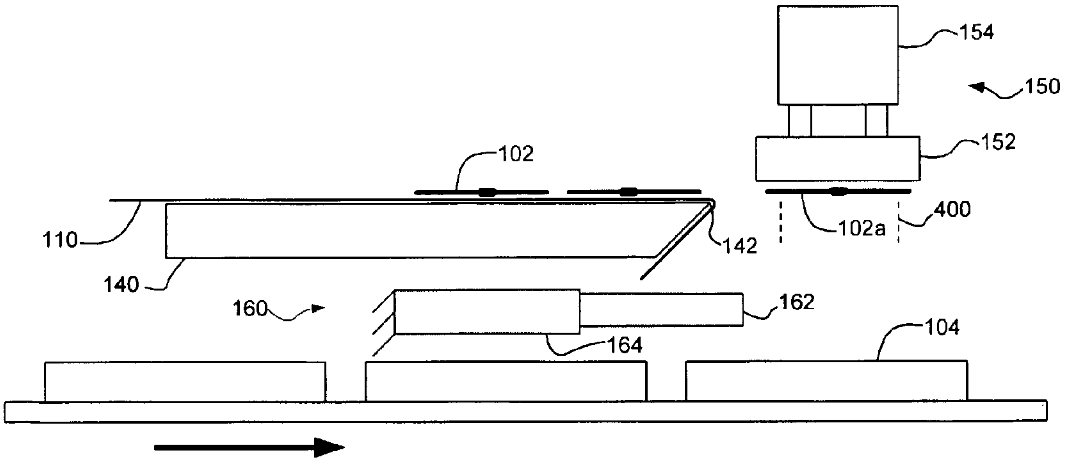
FIGS. 4A-4C are side views of one embodiment of a label reject assembly in various positions with respect to a RFID applicator peeler member for use in a RFID applicator.
Figure 4B:
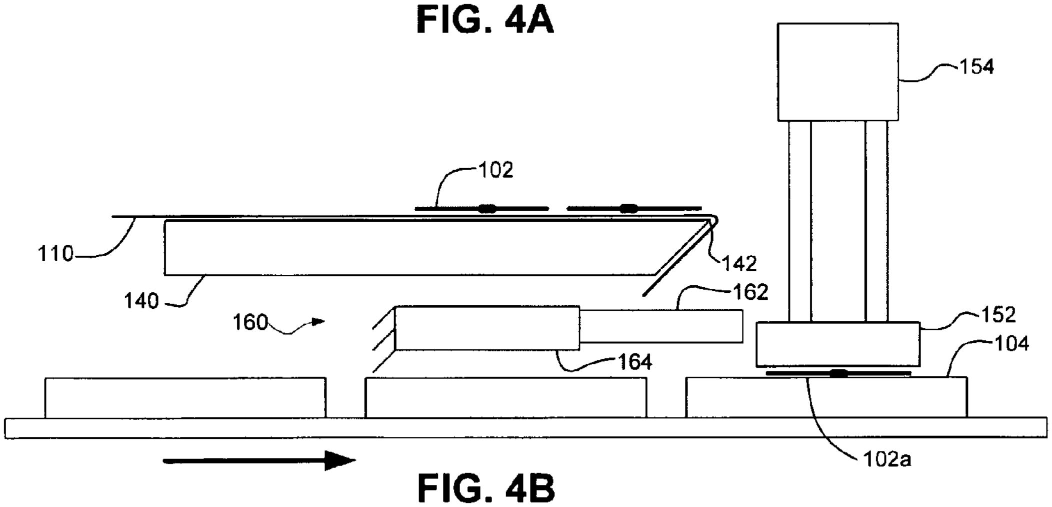
Figure 4C:
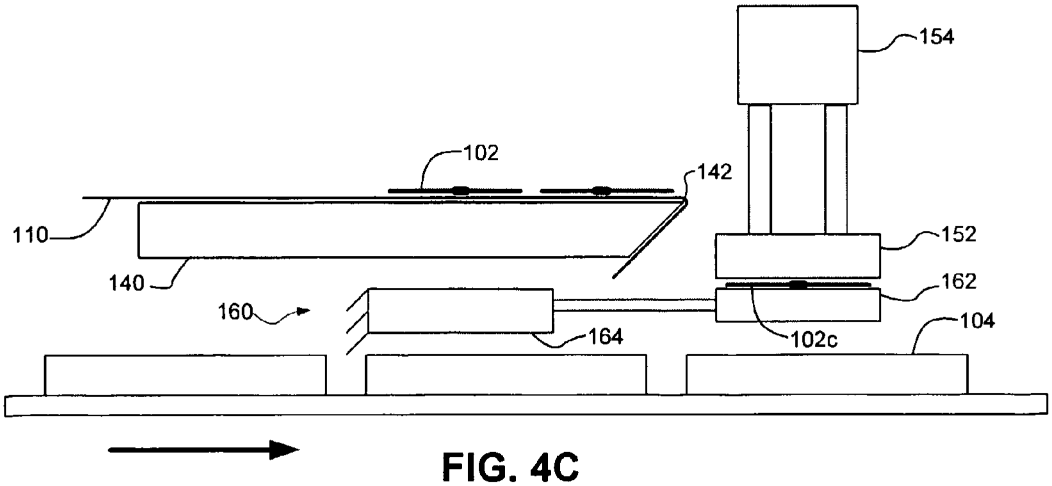

Referring to FIGS. 4A-4C, one embodiment of the label reject assembly 160 is described in greater detail. The accumulation pad 162 may include at least a substrate that is sufficiently rigid to receive and adhere to a rejected RFID label applied by the tamp pad 152. The reject driving mechanism 164 may be mounted in any location that enables the accumulation pad 162 to be driven into a path 400 of the tamp apply stroke (i.e., between the tamp pad 152 and the item 104) and then withdrawn such that the tamp pad 152 will clear the accumulation pad 162 and the rejected label(s) on the accumulation pad 162.

The accumulation pad 162 may be configured to receive multiple rejected RFID labels stacked on previous rejected labels. The accumulation pad 162 may also be configured to receive rejected labels adjacent to other rejected labels (e.g., multiple adjacent stacks). The accumulation pad 162 may be sized according to the size of the labels and the manner in which the labels are accumulated (e.g., one stack or adjacent stacks) on the accumulation pad. For example, an accumulation pad 162 may have a size that is capable of adhering to and receiving at least one label or may have a size that is capable of receiving multiple adjacent stacks of labels.

The accumulation pad 162 may include a low surface energy medium, such as polytetrafluoroethylene, at least on the surface of the accumulation pad 162, which allows the accumulated RFID label(s) to be easily removed by peeling away the bottom label. The accumulation pad 162 may also include a removable layer, such as an index card material, to allow the accumulated RFID label(s) to be removed.

According to one method of rejecting RFID labels, the RFID labels 102 on the web 110 may be programmed prior to passing the web 110 around the peel tip 142 of the peeler member 140, for example, as described above. Programming the RFID labels may include detecting any defective RFID labels that should be rejected. A RFID label 102*a* that is properly programmed may be removed and applied to an item (FIGS. 4A and 4B). Upon detecting a defective RFID label 102*c*, the label accumulation pad 162 may be extended from a retracted position (FIGS. 4A and 4B) to an extended position (FIG. 4C) into the path 400 between the tamp pad 152 and the item 104. In the extended position, the label accumulation pad 162 prevents a full tamp apply stroke down to the item 104 and thus intercepts the rejected RFID label 102*c* before the rejected RFID label 102*c* is applied to an item 104. The tamp pad 152 may apply the rejected RFID label 102*c* to the accumulation pad 162 in the same manner as applying labels to items 104, as described in greater detail below. The accumulation pad 162 with the rejected RFID label(s) 102*c* applied thereto may then be retracted and normal label application may continue.

The accumulation pad 162 may also be extended to different positions within the path 400 of the tamp apply stroke such that labels are received on the accumulation pad 162 adjacent to other labels. The controller 170 may control the reject driving mechanism 164 to control positioning of the accumulation pad 162 such that labels are positioned in an organized fashion (e.g., spread evenly) on the accumulation pad 162.

The accumulated rejected RFID labels may be removed from the accumulation pad 162 after a number of rejected labels accumulate on the accumulation pad 162. The number of accumulated rejected labels may be monitored. According to one method, a numeric reject number may be printed (e.g., using an integrated printer) on the surface of a rejected label 102*c* and a reject label counter (e.g., in the controller 170) may be incremented. The controller 170 may provide an indication to the user as to when the accumulated labels should be removed. When the stack of accumulated labels is removed, the last numeric reject number on the top accumulated label will signify the sum of the accumulated labels in the stack, for customer recording purposes.

In one embodiment, about twenty (20) to thirty (30) labels may be accumulated on the accumulation pad 162 before removing the labels. One embodiment of the RFID label applicator 100 may have a label programming failure rate of about 5%. In other words, about 5 out of every 100 RFID labels may be rejected as defective, which allows about 400 to 600 RFID labels to be applied before the stack of accumulated labels is removed. The label reject assembly 160 thus allows labels, such as defective RFID labels, to be rejected (i.e., not applied to an item 104) with minimal or no interruption to the label application process. Alternatively, a rejected RFID label may be removed from the accumulation pad 162 after each rejected label is intercepted by the accumulation pad 162.

Figure 5A:
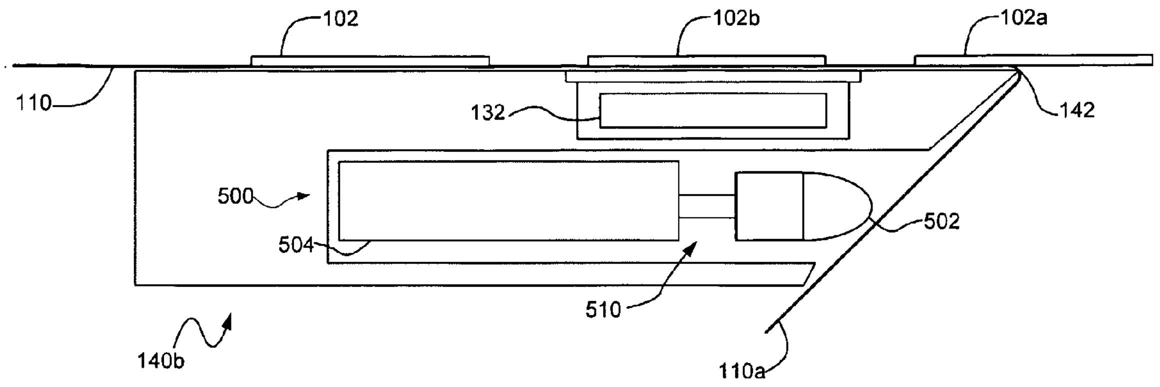
FIGS. 5A and 5B are side views of another embodiment of a label reject assembly integrated into a RFID applicator peeler member for use in a RFID applicator.
Figure 5B:
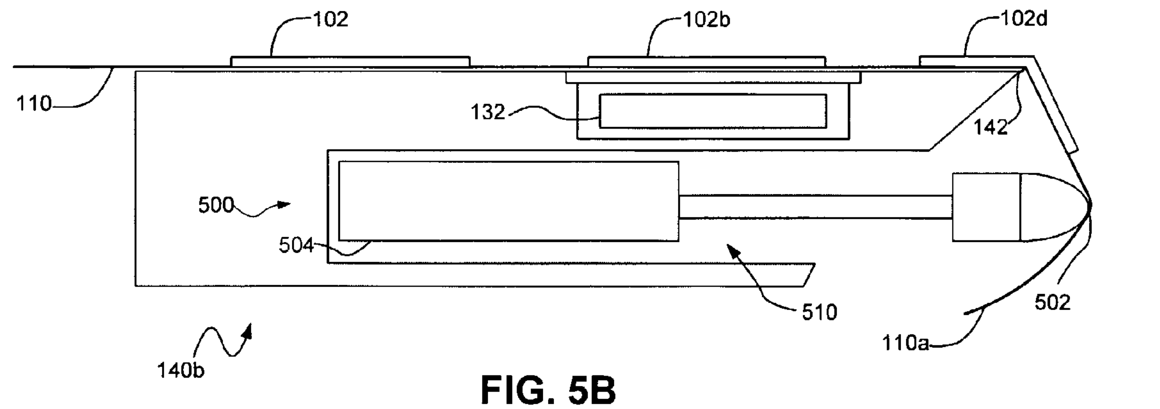

An alternative embodiment of a label reject assembly may include the extendable path altering mechanism 500 shown in FIGS. 5A and 5B. The extendable path altering mechanism 500 is extendable from a retracted position (FIG. 5A) to an extended position (FIG. 5B). In the extended position, the extendable path altering mechanism 500 may alter a path of the web 110 around the peel tip 142, effectively enlarging the radius of the peel tip 142. As a result, a rejected RFID label 102*d* passing around the peel tip 142 does not peel away from the web 110 and continues moving with the scrap web 110*a* instead of being applied to an item. Rejected RFID labels, such as defective RFID labels, may thus be handled automatically with minimal or no effect on the application process.

The extendable path altering mechanism 500 may include an extendable tip 502 coupled to a tip driving mechanism 504. The extendable tip 502 may be rounded with a larger radius than the peel tip 142. In one example, the radius of the extendable tip 502 may be in a range of about 0.25 to 0.5 in. The extendable tip 502 may be made of plastic, aluminum or other suitable material that allows the web 110 to slide around the extendable tip 502. The tip driving mechanism 504 may include a pneumatic actuated air cylinder, although those skilled in the art will recognize that other linear actuators or driving mechanisms may be used.

In one embodiment, the extendable path altering mechanism 500 may be integrated with another embodiment of the peeler member 140*b*. The peeler member 140*b* may include a cavity 510 for receiving the extendable path altering mechanism 500. Alternatively, the extendable path altering mechanism 500 may be located adjacent to the peeler member 140*b* as long as the extendable tip 502 can extend to alter the path of the web 110 in a manner that will prevent a label from peeling away. The peeler member 140*b* may also include the RFID programming antenna 132 integrated with the peeler member 140*b*, for example, as described above.

According to one method of rejecting RFID labels using the extendable path altering mechanism 500, a RFID label 102*b* on the web 110 may be programmed prior to passing the RFID label around the peel tip 142 of the peeler member 140*b*, for example, using the integrated RFID programming antenna 132. Programming the RFID label 102*b* may include detecting whether or not the RFID label 102*b* is defective, e.g., by attempting to read information programmed thereon. A RFID label 102*a* that is properly programmed is caused to peel away from the web 110 as the web 110 and the RFID label 102*a* passes around the peel tip 142 of the peeler member 140*b*. Upon detecting a defective RFID label 102*d*, the path of the web 110 around the peel tip 142 may be altered using the extendable path altering mechanism 500, for example, by extending the extendable tip 502 beyond the peeler tip 142. When the extendable tip 502 is extended, the web 110 may be advanced to position the next RFID label 102 for programming and/or application and the rejected RFID label 102*d* passes around the extendable tip 502 and remains on the scrap web 110*a* instead of being applied to the tamp pad 152. The extendable tip 502 may then be retracted and normal label application may continue.

To allow the path of the web 110 to be altered, the tension in the web 110 may be released such that the scrap web 110*a* unwinds and the position of the RFID label 102*b* can be maintained on the peeler member 140*b*. The tension in the web 110 may be released, for example, by releasing a torque brake on a motor driving the web rewind roll and/or releasing the drive and nip roller assembly.

Figure 6A:
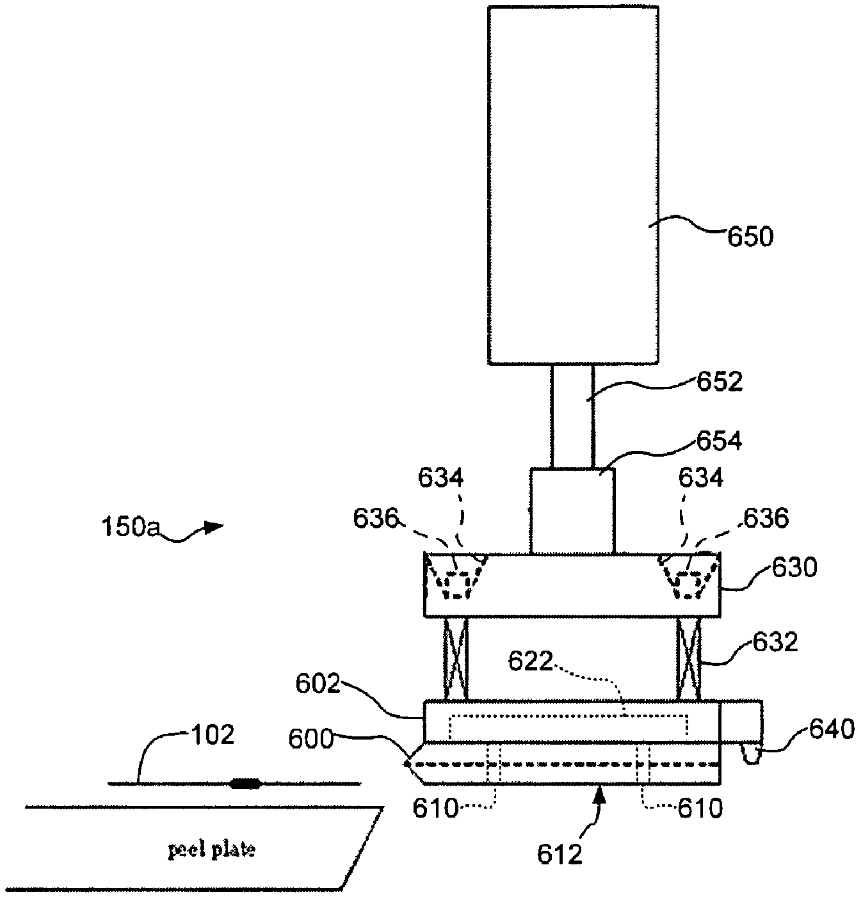
FIG. 6A is a side view of one embodiment of a label tamp assembly.
Figure 6B:
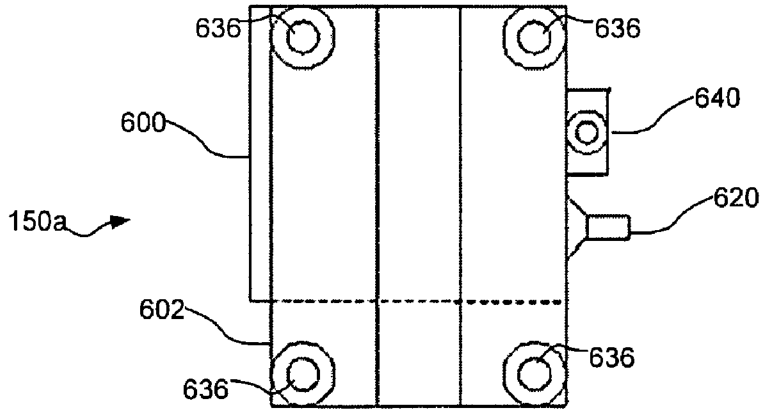
FIG. 6B is a top view of the label tamp assembly shown in FIG. 6A.

Referring to FIGS. 6A and 6B, another embodiment of the tamp assembly 150*a* is described in greater detail. The tamp assembly 150*a* may include a vacuum tamp pad 600 coupled to an air manifold 602. The vacuum pad 600 may include one or more vacuum holes 610 extending through the vacuum pad 600 to a label contacting side 612. The manifold 602 may include an inlet/outlet 620 and at least one air chamber 622 located over the vacuum holes 610 in the vacuum pad 600. The inlet/outlet 620 may be coupled to an air supply or compressor, which may be switched between compressed air and a vacuum. When a vacuum is applied, air may be drawn through the inlet/outlet 620 and the chamber 622 in the manifold 602, which causes air to be drawn through the vacuum holes 610 in the vacuum pad 600. As a result, a vacuum pressure is generated around the vacuum holes 602 on the label contacting side 612 of the vacuum pad 600, which is sufficient to hold the label 102 against the vacuum pad 600.

Figure 7B:
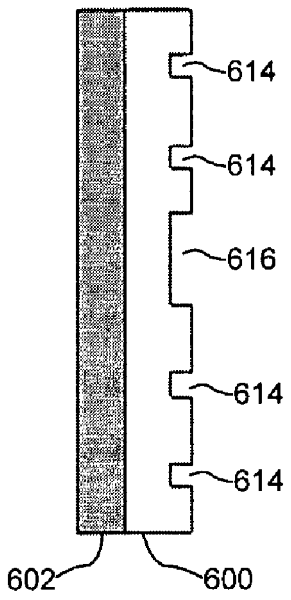
FIG. 7B is a cross-section view of the vacuum tamp pad shown in FIG. 7A taken along line A-A.
Figure 7A:
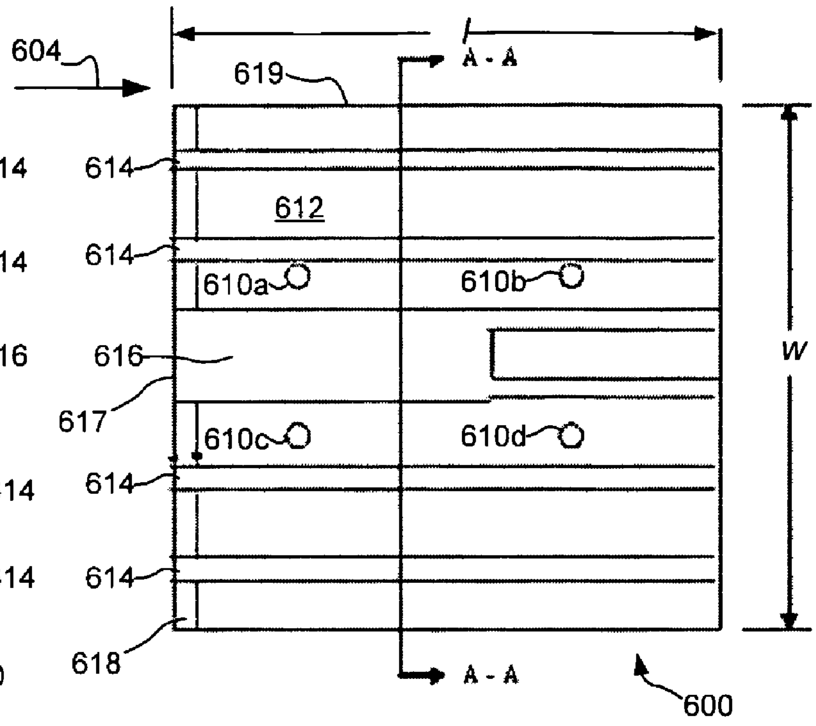
FIG. 7A is a bottom view of one embodiment of a vacuum tamp pad that may be used in a label tamp assembly.
Figure 7C:
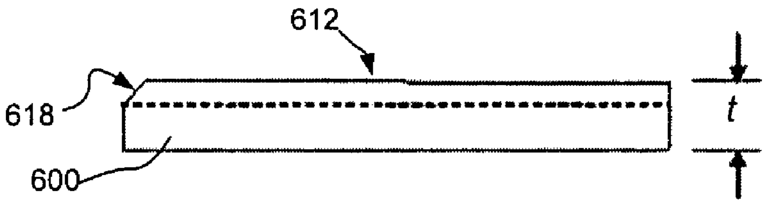
FIG. 7C is a side view of the vacuum tamp pad shown in FIG. 7A.

As shown in FIGS. 7A-7C, the vacuum tamp pad 600 may include slots or channels 614 extending along the label contacting side 612 to promote air discharge when the vacuum is drawn. The slots or channels 614 may also provide for less friction against a label when transferring the label to the tamp pad 600 (e.g., in the label feed direction 604). The vacuum tamp pad 600 may also include a relief area 616 configured to receive the portion of the RFID label with the IC chip. The relief area 616 protects the IC chip from stresses due to abrasion during label transfer to the pad 600 and protects the IC chip from compressive stresses during tamp placement of the RFID label onto an item or product. The vacuum tamp pad 600 may further include a chamfer 618 at a leading edge 617 of the vacuum tamp pad 600 to promote easy label transfer to the tamp pad 600, as the label moves in the label feed direction 604 from the peeler member.

The embodiment of the vacuum tamp pad 600 shown in FIGS. 7A-7C is designed for a 3 in.×3 in. RFID label. For this example, the vacuum pad 600 may have a length l of about 3.125 in., a width w of about 3.00 in. and a thickness t of about 0.25 in. The tamp pad 600 may be made of a plastic material, such as the type available under the name Delrin, or other suitable materials.

This described embodiment of the vacuum pad 600 includes four (4) vacuum holes 610*a*-610*d*. The vacuum holes 610*a*-610*d* may be located to minimize the effect of label bow or curl and to allow each of the vacuum holes 610*a*-610*d* to be sealed regardless of the amount of label bow, thereby effectively holding the label on the vacuum pad 600. For example, the holes 610*a* and 610*c* may be located in from the leading edge 617 about ¼ of the length of the vacuum pad 600 and the holes 610*b* and 610*d* may be located in from the leading edge 617 about ¾ of the length of the vacuum pad 600. The holes 610*a* and 610*b* may be located in from the side edge 619 about ⅓ of the length of the vacuum pad 600 and the holes 610*c* and 610*d* may be located in from the side edge 619 about ⅔ of the length of the pad 600. The holes 610*a*-610*d* may have a diameter of about 0.093".

The vacuum pad 600 and/or manifold 602 may be mounted to a mounting block 630 with one or more compression springs 632 positioned therebetween (FIG. 6A). The compression springs 632 may compress as needed when the vacuum tamp pad 600 contacts a product, allowing the tamp pad 600 to mate parallel with a surface of an item or product to which a label is being applied. The mounting block 630 may include tapered holes 634 that receive shoulder bolts 636, which secure the compression springs 632 and allow the compression springs 632 to compress. Although the described embodiment shows four (4) compression springs 632, any number of compression springs may be used to provide the desired compression, as may be determined by one of ordinary skill in the art.

A proximity sensor 640 may also be mounted to the manifold 602 or to the vacuum tamp pad 600 to detect the surface of the item or product to which the label is to be applied. The proximity sensor 640 may thus enable consistent compression of the compression springs 632 when labels are being applied to items or products having surfaces at different levels.

The tamp assembly 150 may also include a cylinder 650, such as a pneumatic actuated air cylinder, and rod 652 for providing the linear driving force. A cylinder mounting block 654 may be used to mount the mounting block 630 to the rod 652. Those skilled in the art will recognize that other linear actuators or driving mechanisms may also be used.

Figure 8A:
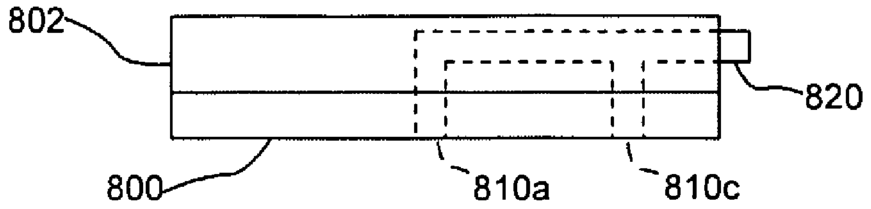
FIG. 8A is a side view of another embodiment of a vacuum tamp pad for use in a RFID applicator.
Figure 8B:
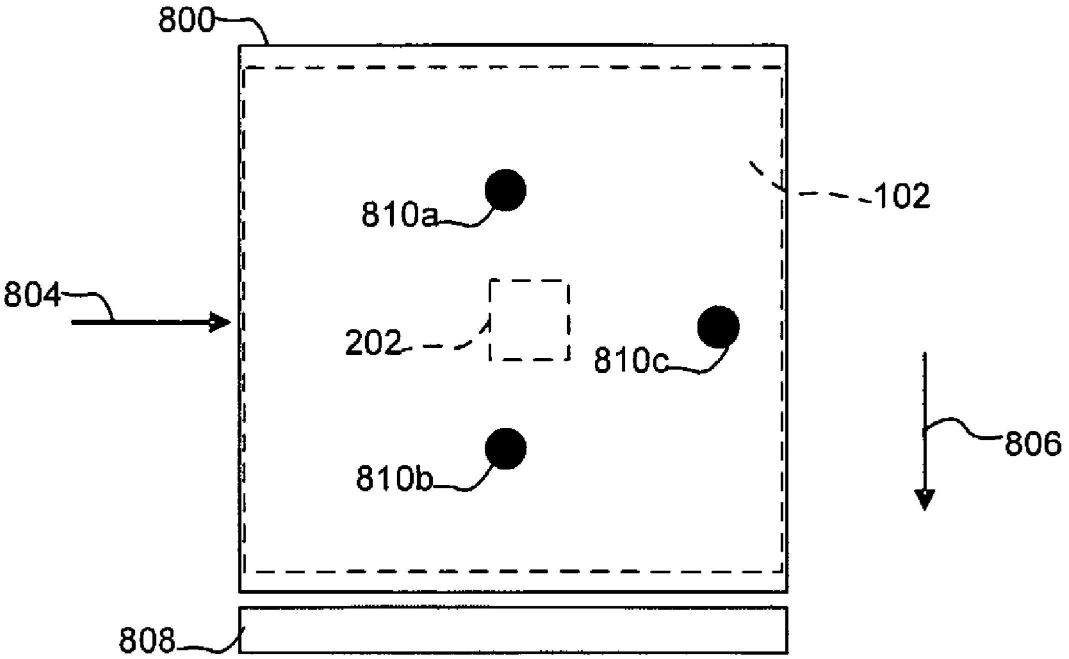
FIG. 8B is a bottom view of the vacuum tamp pad shown in FIG. 8A.

According to an alternative embodiment, shown in FIGS. 8A and 8B, a vacuum tamp pad 800 may include only three vacuum holes 810*a*-810*c*. A manifold 802 with an inlet/outlet 820 may be coupled to the tamp pad 800 to cause air to pass through the vacuum holes 810*a*-810*c*. The vacuum holes 810*a*-810*c* may be positioned such that the leading portion of a RFID label 102 is secured by the vacuum force when the RFID label 102 is properly positioned. The trailing portion of the RFID label 102 may be left free (i.e., not subject to a vacuum) to relieve bow in the label 102. The vacuum hole 810*c* near the far edge of the RFID label 102 may act as a label stop. The vacuum holes 810*a*-810*c* thus take into account the natural bow that is inherent to RFID labels that are provided in roll format.

A fixed stop 808 may be positioned adjacent the vacuum pad 800 to allow the label to feed (i.e., in the feed direction 804) and orient properly. When the RFID label 102 is being fed to the side of an item (e.g., a box) at a 90 degree angle relative to a vertical plane (i.e., sideways), the fixed stop 808 may prevent a gravity force 806 from misaligning the RFID label 102 with respect to the vacuum pad 800. The fixed stop 808 may be fixed (e.g., bolted) to a bottom side of the tamp driving mechanism or cylinder.

The vacuum holes 810*a*-810*c* may also be positioned to hold the RFID label 102 in place without subjecting the IC chip 202 in the RFID label 102 to vacuum forces at the holes 810*a*-810*c*. The vacuum pad 800 may also be recessed (not shown) in the area receiving the IC chip 202 to provide additional relief. The vacuum pad 800 may also include a compressible material, to avoid damage to the IC chip 202 in the RFID label 102.

While the principles of the invention have been described herein, it is to be understood by those skilled in the art that this description is made only by way of example and not as a limitation as to the scope of the invention. Other embodiments are contemplated within the scope of the invention in addition to the embodiments shown and described herein. Modifications and substitutions by one of ordinary skill in the art are considered to be within the scope of the invention, which is not to be limited except by the following claims.

What is claimed is:

1. A radio frequency identification (RFID) label applicator comprising:

a peeler member including a peel end, said peeler member being configured to cause an RFID label to peel away from a web when said web passes around said peel end, said peeler member having body portion defining a cavity in said peeler member;

an RFID programming antenna located within said cavity, said RFID programming antenna being configured to transmit programming signals to an RFID label on said web prior to passing around said peel end;

an RFID programmer coupled to said RFID programming antenna, said RFID programmer being configured to generate said programming signals; and a label tamp assembly, said label tamp assembly being configured to receive said RFID label peeled away from said web and to move said RFID label into contact with an item on which said RFID label is to be applied.

2. The RFID label applicator of claim 1 further comprising a label reject assembly configured to prevent defective RFID labels from being applied to items.

3. The RFID label applicator of claim 2 wherein said label reject assembly comprises an extendable path altering mechanism located proximate said peel end, said extendable path altering mechanism being configured to advance from a retracted position to an extended position such that said extendable path altering mechanism alters a path of said web around said peel end, and wherein said extendable path altering mechanism is positioned and dimensioned to inhibit an RFID label from peeling away from said web when said extendable path altering mechanism is in said extended position.

4. The RFID label applicator of claim 2 wherein said label reject assembly comprises an accumulation pad configured to extend into a path of said label tamp assembly to receive at least one RFID label before said RFID label is applied to an item.

5. The RFID label applicator of claim 1 further comprising a cover over said cavity, wherein said cover includes a material that allows said programming signals to pass through.

6. The RFID label applicator of claim 1 wherein said RFID programming antenna is configured to be laterally adjustable within said cavity.

7. The RFID label applicator of claim 1 wherein said label tamp assembly includes a tamp pad configured to receive said RFID label peeled away from said web.

8. The RFID label applicator of claim 7 wherein said tamp pad includes a vacuum pad.

9. An RFID label applicator comprising:

a peeler member including a peel end, said peeler member being configured to cause an RFID label to peel away from a web when said web passes around said peel end of said peeler member;

an RFID programming system configured to program RFID labels prior to passing around said peel end and to detect defective RFID labels, said RFID programming system including an RFID antenna integrated into said peeler member;

a label tamp assembly, said label tamp assembly being configured to receive said RFID label peeled away from said web and to move said RFID label into contact with an item on which said RFID label is to be applied; and a label reject assembly configured to extend from a retracted position to an extended position into a path of said label tamp assembly to receive at least one RFID label before said RFID label is applied to an item if said RFID programming system detects a defective RFID label.

10. The RF ID label applicator of claim 9, wherein said label reject assembly includes an accumulation pad for receiving said at least one RFID label before said RFID label is applied to said item.

11. The RF ID label applicator of claim 10, wherein said label reject assembly includes a driving mechanism coupled to said accumulation pad and configured to move said accumulation pad from said retracted position to said extended position.

12. The RFID label applicator of claim 10, wherein said label reject assembly is configured to move said accumulation pad to said extended position in response to detection of a defective RFID label.

13. The RFID label applicator of claim 9, wherein said label tamp assembly includes a vacuum pad.

14. A method of rejecting RFID labels in a RFID label applicator, said method comprising:

programming RFID labels on a web prior to passing said RFID labels around a peel end of a peeler member, wherein programming said RFID labels includes detecting any defective RFID labels;

causing programmed RFID labels to peel away from said web as said RFID labels pass around said peel end of said peeler member; and receiving an RFID label on a label tamp assembly after said RFID label has peeled away from said web;

moving said label tamp assembly with said RFID label toward an item on which a label is to be applied; and upon detecting a defective RFID label, extending a label accumulation pad into a path of said label tamp assembly such that said defective RFID label is applied to said label pad instead of being applied to an item, wherein said label accumulation pad is extended to different positions such that defective RFID labels are applied to different locations on said accumulation pad.

15. A radio frequency identification (RFID) label applicator comprising:

a peeler member including a peel end, said peeler member being configured to cause an RFID label to peel away from a web when said web passes around said peel end, an RFID programming antenna, said RFID programming antenna being configured to transmit programming signals to an RFID label on said web prior to passing around said peel end;

an RFID programmer coupled to said RFID programming antenna, said RFID programmer being configured to generate said programming signals to program an RFID label, wherein said RFID programming antenna is further configured to receive RF signals transmitted from said RFID label, and said RFID programmer is further configured to read and validate a label after programming and indicate if an RFID label is either a programmed RFID label or a defective RFID label;

a label tamp assembly, said label tamp assembly being configured to receive said programmed RFID label peeled away from said web and to move said RFID label into contact with an item on which said RFID label is to be applied; and a label reject assembly to prevent defective RFID labels from being applied to items; comprising:

a label accumulation pad configured to receive defective RFID labels thereon;

a label reject driving mechanism coupled to said accumulation pad operable to extend said label accumulation pad into a path of said label tamp assembly upon detection of a defective RFID label whereby a defective RFID label is deposited on said accumulation pad label before said defective RFID label is applied to an item; and a positioning controller coupled to said label driving mechanical operable to control the positioning of the accumulation pad such that defective RFID labels are applied to different locations on said accumulation pad.

16. The RFID label applicator of claim 15 wherein said peeler member defines a cavity, and wherein said RFID programming antenna is located within said cavity.

17. The RFID label applicator of claim 16 further comprising a cover over said cavity, wherein said cover includes a material that allows said programming signals to pass through.

18. The RFID label applicator of claim 16 wherein said RFID programming antenna is configured to be laterally adjustable within said cavity.

* * * * *